Patented Nov. 24, 1931

1,833,567

UNITED STATES PATENT OFFICE

EUGEN GLIETENBERG, OF LEVERKUSEN-ON-THE-RHINE, GERMANY, ASSIGNOR TO GENERAL ANILINE WORKS, INC., OF NEW YORK, N. Y., A CORPORATION OF DELAWARE

NEW WATER-INSOLUBLE AZO DYESTUFFS

No Drawing. Application filed January 19, 1928, Serial No. 248,012, and in Germany January 25, 1927.

The present invention concerns new water-insoluble azo dyestuffs. They have most probably the general formula:

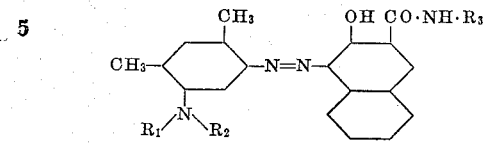

wherein $R_1$ represents hydrogen, alkyl, aralkyl, $R_2$ a benzoyl- or substituted benzoyl-group, and $R_3$ an aromatic nucleus which may be substituted by any substituent, e. g. an alkyl, an alkoxy, the nitro group or halogen, none of these substituents being a hydroxy-, sulfo- or carboxylic acid group.

My new dyestuffs are prepared in substance or on the fibre by combining the arylides of the 2:3-hydroxynaphthoic acid with the diazo compounds of such asymmetric meta xylidines, as have another amino group in the meta position to the xylidine amino group in which one of the hydrogen atoms may be replaced by alkyl- or aralkyl- group and the other hydrogen is substituted by a benzoyl or substituted benzoyl group.

In accordance with the invention azo dyestuffs are obtained, which are distinguished by outstanding fastness to light and kier boiling dyeing cotton especially clear shades, similar to alizarine red. The color lakes prepared from them are distinguished by full bluish-red shades of exceeding clearness and fastness to light.

In their dry pulverized form they are generally red powders insoluble in water, soluble in sulfuric acid with a bluish-red coloration and yielding upon reduction with stannous chloride and hydrochloric acid a substituted meta-xylidine of the general formula:

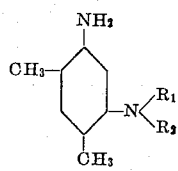

wherein $R_1$ and $R_2$ mean the same substituents as mentioned above and an arylide of an 1-amino-2:3-hydroxy-naphthoic acid.

The following examples will illustrate my invention:

*Example 1.*—Cotton which has been impregnated with a solution of 5 grams of 2:3-hydroxynaphthoic acid α-naphthalide per litre is developed in the known manner with a solution containing 2,4 grams of diazotized benzoylamino-as-meta-xylidine of the formula:

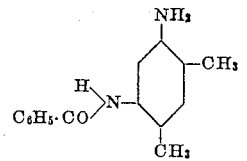

and soaped. A bluish red dyeing is thus obtained.

*Example 2.*—Cotton which has been impregnated with a solution of 4 grams of β-naphthylamide of 2:3-hydroxy-naphthoic acid per litre is developed in the known manner with a solution containing 2,4 grams of diazotized benzoylamino-as-meta-xylidine of the formula mentioned in Example 1 and soaped. A bluish-red dyeing of exceeding fastness to kier boiling results.

*Example 3.*—Cotton which has been impregnated with a solution of 5 grams of 2:3-hydroxynaphthoic acid-5-chloro-2-toluidide per litre is developed with a solution of diazotized 2,5 grams of methyl-benzoyl-amino-as-meta-xylidine of the formula:

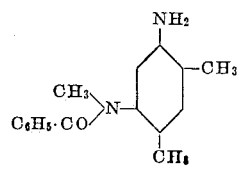

and worked up in the known manner. A bluish-red dyeing is produced.

*Example 4.*—When 3 grams of dichloro-benzoyl-amino as-meta-xylidine of the formula:

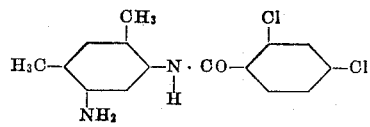

per litre are taken instead of methylbenzoyl amino xylidine of Example 3, a more yellow bluish red dyeing in obtained than in Examples 1 and 2.

I claim:

1. As new products the mono-azo-dyestuffs of the general formula:

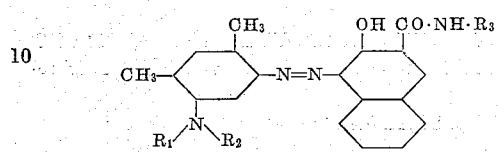

wherein $R_1$ represents hydrogen, alkyl, benzyl, $R_2$ a benzoyl-group, and $R_3$ an aromatic nucleus of the benzene or naphthalene series and wherein all nuclei may be substituted by substituents of the group consisting of alkyl, alkoxy, halogen and nitro, being in their dry pulverized form generally red powders insoluble in water, soluble in sulfuric acid with a bluish-red coloration and yielding upon reduction with stannous chloride and hydrochloric acid a substituted meta-xylidine of the general formula:

wherein $R_1$ and $R_2$ mean the same substituents as mentioned above and an arylide of an 1-amino-2.3-hydroxy-naphthoic acid, dyeing cotton bluish red shades being distinguished by outstanding fastness to light.

2. As a new product the mono-azo-dyestuff of the formula:

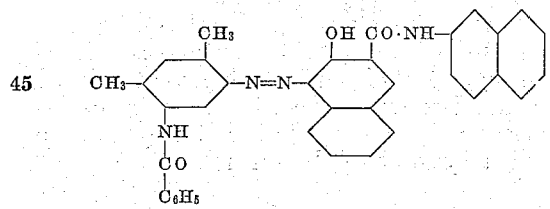

being in its dry pulverized form a red powder, insoluble in water, soluble in sulfuric acid with a bluish-red coloration, yielding upon reduction with stannous chloride and hydrochloric acid 1-amino-2-hydroxy-3-naphthoic acid-β-naphthalide and benzoyl-amino-as-meta-xylidine, dyeing cotton clear bluish-red shades of good fastness to light and kier boiling.

3. As new products of manufacture material dyed clear bluish-red shades of good fastness to light and kier boiling with a dyestuff as claimed in claim 1.

4. As new products of manufacture material dyed clear bluish-red shades of good fastness to light and kier boiling with the dyestuff of the probale formula:

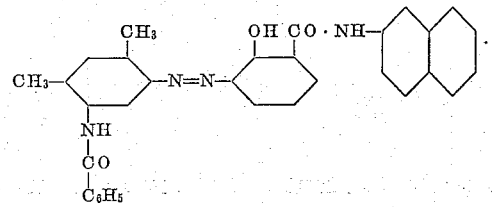

In testimony whereof I have hereunto set my hand.

EUGEN GLIETENBERG.